(12) United States Patent
Tsai

(10) Patent No.: US 7,178,928 B2
(45) Date of Patent: Feb. 20, 2007

(54) LUMINOUS SOURCE FOR READING MATERIAL

(75) Inventor: Ming-Chiang Tsai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 127 days.

(21) Appl. No.: 10/936,261

(22) Filed: Sep. 7, 2004

(65) Prior Publication Data
US 2005/0052860 A1    Mar. 10, 2005

(30) Foreign Application Priority Data
Sep. 5, 2003    (TW) .............................. 92124618 A

(51) Int. Cl.
*A47B 19/00*    (2006.01)
(52) U.S. Cl. ........................................ 362/98
(58) Field of Classification Search ............... 362/602, 362/604, 612, 98, 99
See application file for complete search history.

(56) References Cited

U.S. PATENT DOCUMENTS

| | | | |
|---|---|---|---|
| 6,846,090 B1* | 1/2005 | Smith | 362/99 |
| 2002/0191387 A1* | 12/2002 | Cha et al. | 362/31 |
| 2003/0081407 A1* | 5/2003 | Bennett, Jr. | 362/98 |
| 2003/0123245 A1* | 7/2003 | Parker et al. | 362/31 |

* cited by examiner

*Primary Examiner*—Renee Luebke
*Assistant Examiner*—Julie A. Shallenberger
(74) *Attorney, Agent, or Firm*—Wei Te Chung

(57) ABSTRACT

A luminous source (10) for reading material includes a light source (20), a light guide plate (40), and a frame (60). The light guide plate is adjacent the light source, and converts divergent light beams received from the light source into substantially parallel light beams emitting from a main surface (42) of the light guide plate. The frame defines a support space (62) and has a switch (61). The light guide plate and the light source are secured in the support space. The switch electrically connects with the light source and controls switching of the light source on and off. The parallel light beams illuminate a page of the reading material from underneath the page.

15 Claims, 4 Drawing Sheets

LUMINOUS SOURCE FOR READING MATERIAL

BACKGROUND OF THE INVENTION

1. Field of the Invention

The present invention relates to luminous sources, and especially to a luminous source providing planar light which can illuminate a page from an underside thereof.

2. Description of the Related Art

In the current so-called information era, advances in technology taking place all over the world are said to be giving rise to a "knowledge economy." Renewal of knowledge and industrialization of high technology are key characteristics of the knowledge economy. Students and professionals strive to hasten the innovation of knowledge and industrialization of high tech. With the amount of knowledge expanding at unprecedented rates, it is vital to be able to read material quicker and more efficiently than ever before.

When people need to read at night or under poor lighting conditions, they rely on artificial light sources. When outdoors, people often use flashlights for illuminating reading material. However, the flashlight is generally held by hand. The light beam tends to waver and cause eyestrain. In addition, even when the reader changes hands, he/she is liable to become weary. Under such conditions, one cannot read for very long, and cannot read in comfort. When reading indoors, incandescent or fluorescent lamps are mostly used. Because these lamps are usually fixed on a wall or the ceiling to provide steady illumination, people can read in comfort for as long as they wish. Nevertheless, the light projects down onto a page of the reading material. If the reader wants to write on the page, his/her hand is liable to block out the light coming from the lamp. In addition, excessive light can reflect off the page into the reader's eyes, causing glare and discomfort.

SUMMARY OF THE INVENTION

Accordingly, an object of the present invention is to provide a luminous source for reading material which emits soft planar light, and is easily positioned and expedient to use.

Another object of the present invention is to provide a luminous source for reading material which has a simple structure and is light in weight.

To achieve the above objects, a luminous source for reading material includes a light source, a light guide plate and a frame. The light guide plate is adjacent the light source, and converts divergent light beams received from the light source into substantially parallel light beams emitting from a main surface of the light guide plate. The frame defines a support space and has a switch. The light guide plate and the light source are secured in the support space. The switch electrically connects with the light source, and controls switching of the light source on and off. The parallel light beams illuminate a page of the reading material from underneath the page.

Other objects, advantages and novel features of the present invention will be apparent from the following detailed description of a preferred embodiment thereof with reference to the attached drawings, in which:

DETAILED DESCRIPTION OF THE PREFERRED EMBODIMENTS

Figure 1:
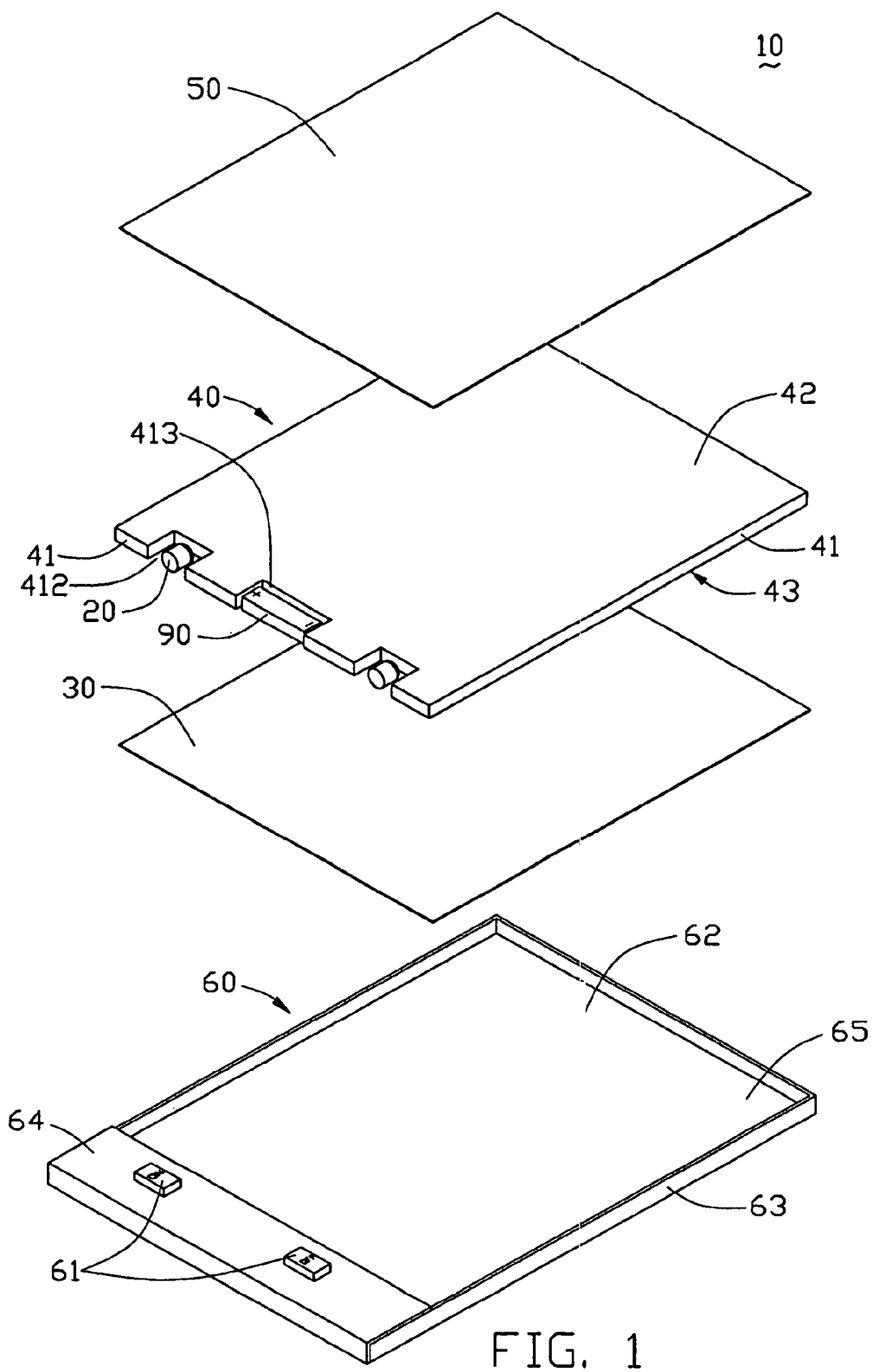
FIG. 1 is an exploded, isometric view of a luminous source for reading material in accordance with the preferred embodiment of the present invention.
Figure 2:
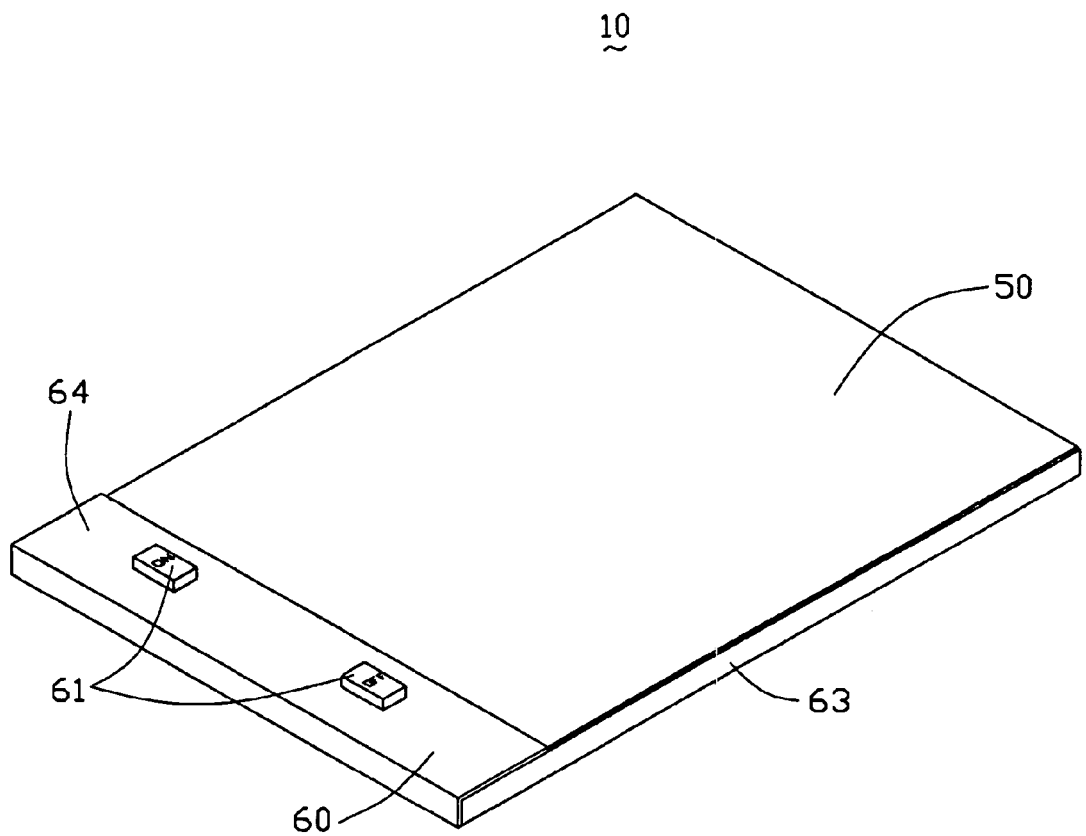
FIG. 2 is an assembled view of FIG. 1.

Referring to FIGS. 1 and 2, a luminous source 10 for reading material comprises a light source including two LEDs 20 and an electricity source 90, a reflection sheet 30, a light guide plate 40, and a transparent sheet 50, which are all positioned in a frame 60. The light guide plate 40 is provided beside the light source. The light guide plate 40 converts divergent light beams from the LEDs 20 into substantially parallel light beams, which emit from an optical output surface 42 of the light guide plate 40.

The light guide plate 40 is substantially rectangular, and comprises the optical output surface 42, a bottom surface 43, and side surfaces 41 between the optical output surface 42 and bottom surface 43. One side surface 41 adjacent the light source is indented, thereby defining two notches 412 and a cutout 413. The notches 412 and the cutout 413 respectively receive the corresponding LEDs 20 and electricity source 90. As seen in FIG. 1, the electricity source 90 is positioned between the LEDs 20. To improve optical performance: (1) a multiplicity of reflective dots (not shown) is formed on or applied to the bottom surface 43, in order to promote uniform emission of light from the optical output surface 42; and (2) reflective films (not shown) can be formed on the bottom surface 43 and on other side surfaces 41 that are far away from the light source. The use of the dots and reflective films ensures that virtually all the light beams from the LEDs 20 are eventually evenly emitted from the optical output surface 42.

The frame 60 comprises a soleplate 65, an upper coping 64, and four sidewalls 63 extending from the soleplate 65. The soleplate 65 is substantially planar, and underlies all of the combination of the light source and the light guide plate 40. The reflection sheet 30 is provided between the light guide plate 40 and the soleplate 65. The coping 64 covers all of the light source, the notches 411, the cutout 413 and an end part of the light guide plate 40 on the soleplate 65, thereby allowing expedient handling of the luminous source 10 by users. A size of an exposed portion of the light guide plate 40 is configurable according to need, and can for example be set to be substantially the same size as a page of a book. The transparent sheet 50 is provided on the optical output surface 42 of the light guide plate 40. A portion of the transparent sheet 50 is sandwiched between the light guide plate 40 and the coping 64. The transparent sheet 50, the coping 64, the four sidewalls 63, the soleplate 65 and the reflection sheet 30 cooperatively define a support space 62 therebetween. The support space 62 allows protection of the combined light guide plate 40 and light source, and ensures that all light beams in the light guide plate 40 emit from the transparent sheet 50.

The frame 60 further comprises a pair of switching buttons 61 positioned on the coping 64. The switching buttons 61 electrically connect with the light source, and control switching of the LEDs 20 between on and off statuses. Moveable lids (not shown) are formed on the frame 60, for assembling or disassembling the LEDs 20 and the electricity source 90 expediently. For efficiently utilizing optical energy from the light source, the soleplate 65, the sidewalls 63 and the coping 64 each further comprise a reflection surface facing the combined light guide plate 40 and light source.

Figure 3:
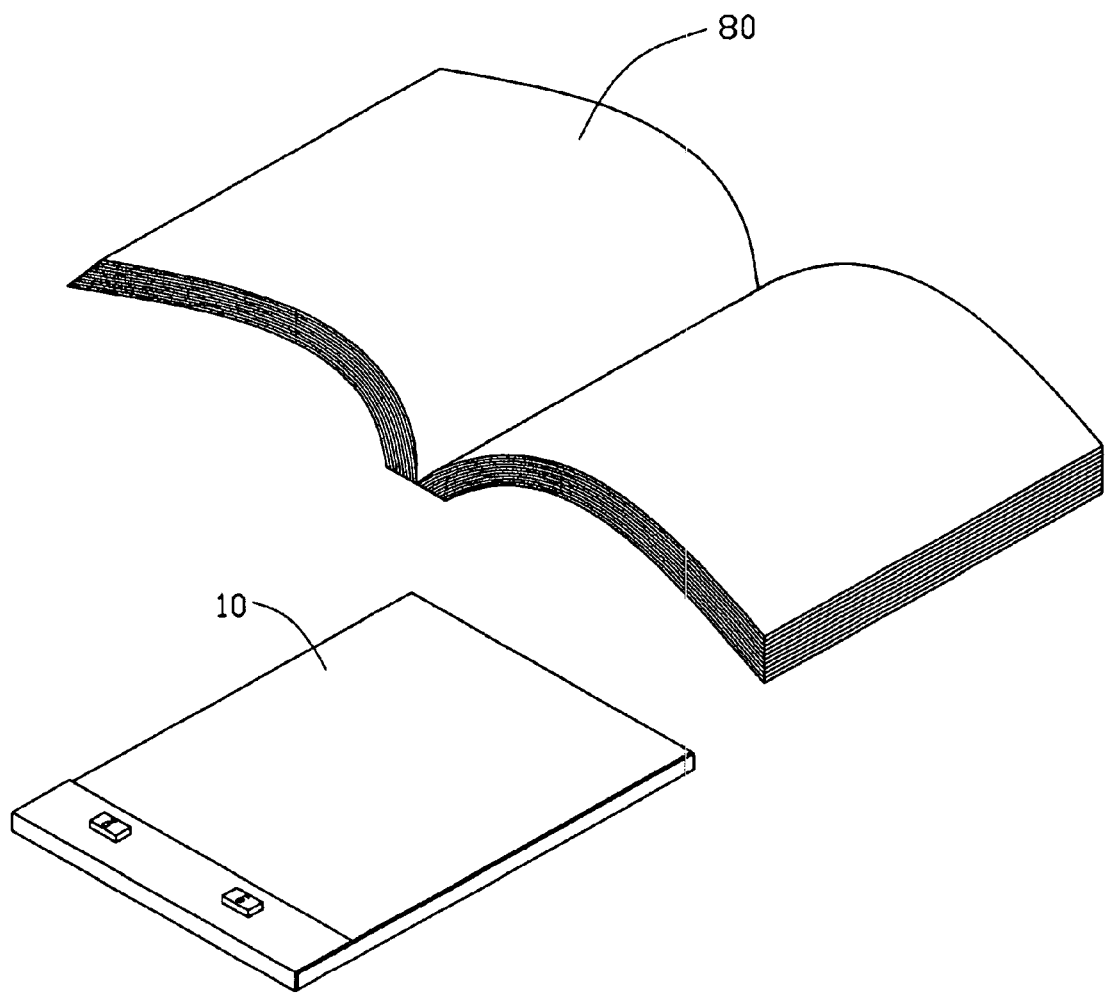
FIG. 3 is an isometric view of the luminous source of FIG. 2, ready to be used with a corresponding piece of reading material such as a book.
Figure 4:
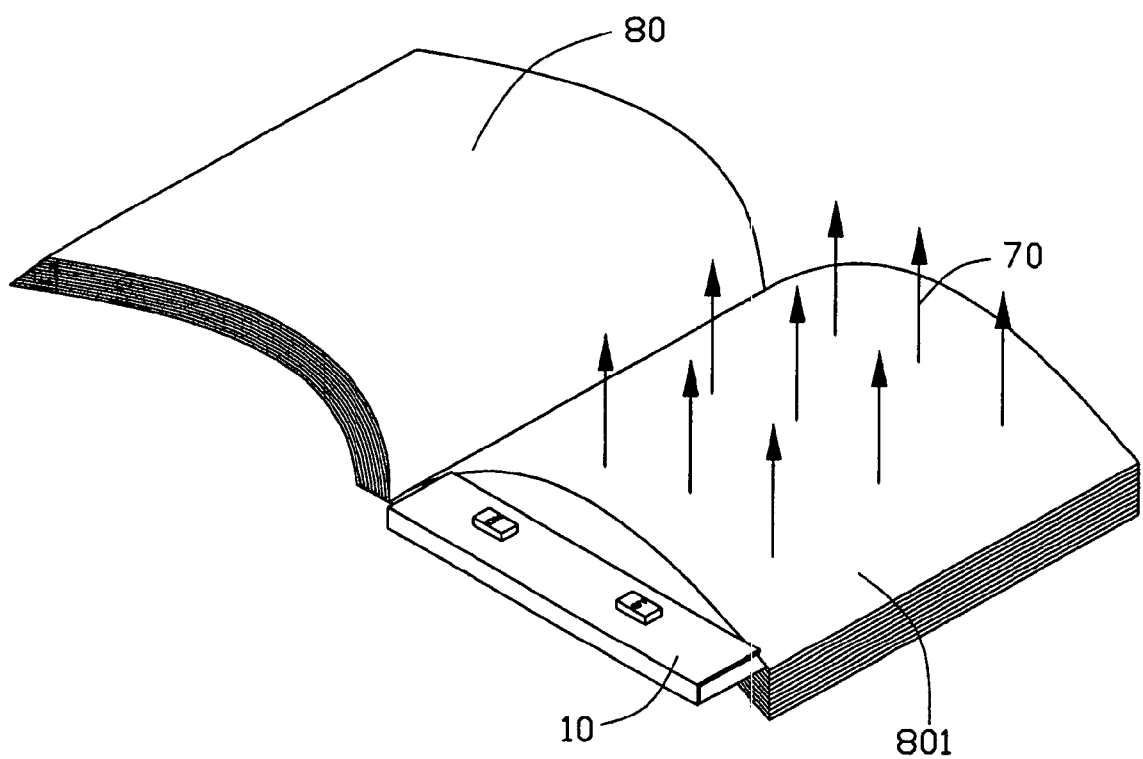
FIG. 4 is similar to FIG. 3, but showing the luminous source in use under a page of the book.

Referring to FIGS. 3 and 4, the luminous source 10 is used when ambient light is insufficient. A user simply puts the luminous source 10 under a page 801 of a piece of reading material 80 with the transparent sheet 50 face up, and presses the appropriate switching button 61 in order to turn on the power. Divergent light beams emitted by the LEDs 20 enter the light guide plate 40 through the relevant side surface 41, are reflected and dispersed within and at peripheries of the light guide plate 40, and emit from the output surface 42 and the transparent sheet 50 as planar light 70. The planar light 70 illuminates the page 801 from underneath, thereby giving the page 801 soft illumination when viewed from above. This provides comfortable reading for the user. Furthermore, the luminous source 10 remains stably located under the page 801 by reason of its own weight. The user can read "hands-free," and can write on the page 801 without blocking out the illumination of the page 801. When the user turns the page 801 over, he/she then simply puts the luminous source 10 under the next page.

In alternative embodiments, a cold cathode fluorescent lamp (CCFL) can be used instead of the LEDs 20. The light guide plate 40 can be wedge-shaped. The soleplate 65 can define one or more openings therein, thereby simplifying its structure and reducing the weight of the luminous source 10. The luminous source 10 can further comprise a diffusion sheet sandwiched between the light guide plate 40 and the transparent sheet 50, thereby giving the luminous source 10 even more uniform brightness. All the above-described alternative embodiments can enable the luminous source 10 to achieve the objects of the present invention.

In summary, the luminous source 10 has a simple structure and is light in weight. Perhaps more importantly, it provides soft planar illumination, and allows easy repair or replacement of malfunctioning parts. The luminous source 10 is very expedient as a light source in a dark area, especially outdoors where alternative light sources may be unavailable, inadequate or impractical.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A luminous source for reading material, comprising:
a light source;
a light guide plate adjacent the light source, for converting light beams from the light source into substantially parallel light beams emitting from a main surface of the light guide plate;
a reflection sheet disposed on a surface of the light guide plate opposite to the main surface; and
a frame defining a support space and having a switch, wherein the light guide plate and the light source are secured in the support space, and the switch electrically connects with the light source and controls switching of the light source on and off.

2. The luminous source as described in claim 1, wherein the support space is cooperatively defined by a coping, a soleplate and sidewalls of the frame.

3. The luminous source as described in claim 2, wherein the light guide plate is disposed on the soleplate, and the coping covers all of the light source and an end portion of the light guide plate.

4. The luminous source as described in claim 3, wherein a size of an exposed portion of the light guide plate is configured to be substantially equal to the size of a page of the reading material.

5. The luminous source as described in claim 3, further comprising a transparent sheet generally between the light guide plate and the coping.

6. The luminous source as described in claim 5, further comprising a diffusion sheet between the light guide plate and the transparent sheet.

7. The luminous source as described in claim 2, wherein the soleplate underlies all of the combination of the light guide plate and the light source.

8. The luminous source as described in claim 7, wherein the reflection sheet is disposed between the light guide plate and the soleplate.

9. The luminous source as described in claim 2, wherein the soleplate defines one or more openings therein.

10. The luminous source as described in claim 2, wherein the coping, the soleplate and the sidewall each have a reflection surface facing the light guide plate.

11. The luminous source as described in claim 2, wherein the switch is positioned on the coping.

12. The luminous source as described in claim 1, wherein the light source comprises a light emitting diode and an electricity source supplying power thereto.

13. The luminous source as described in claim 12, wherein the frame comprises a moveable lid for expedient assembly and disassembly of the light emitting diode and electricity source.

14. The luminous source as described in claim 12, wherein the light guide plate defines a notch in a side thereof for securing of the light emitting diode therein.

15. The luminous source as described in claim 12, wherein the light guide plate defines a cutout in a side thereof for securing of the electricity source therein.

* * * * *